Oct. 22, 1940.  C. E. ULRICH  2,218,835
PIPE COUPLING, SEAL, AND THE LIKE
Original Filed Dec. 19, 1936
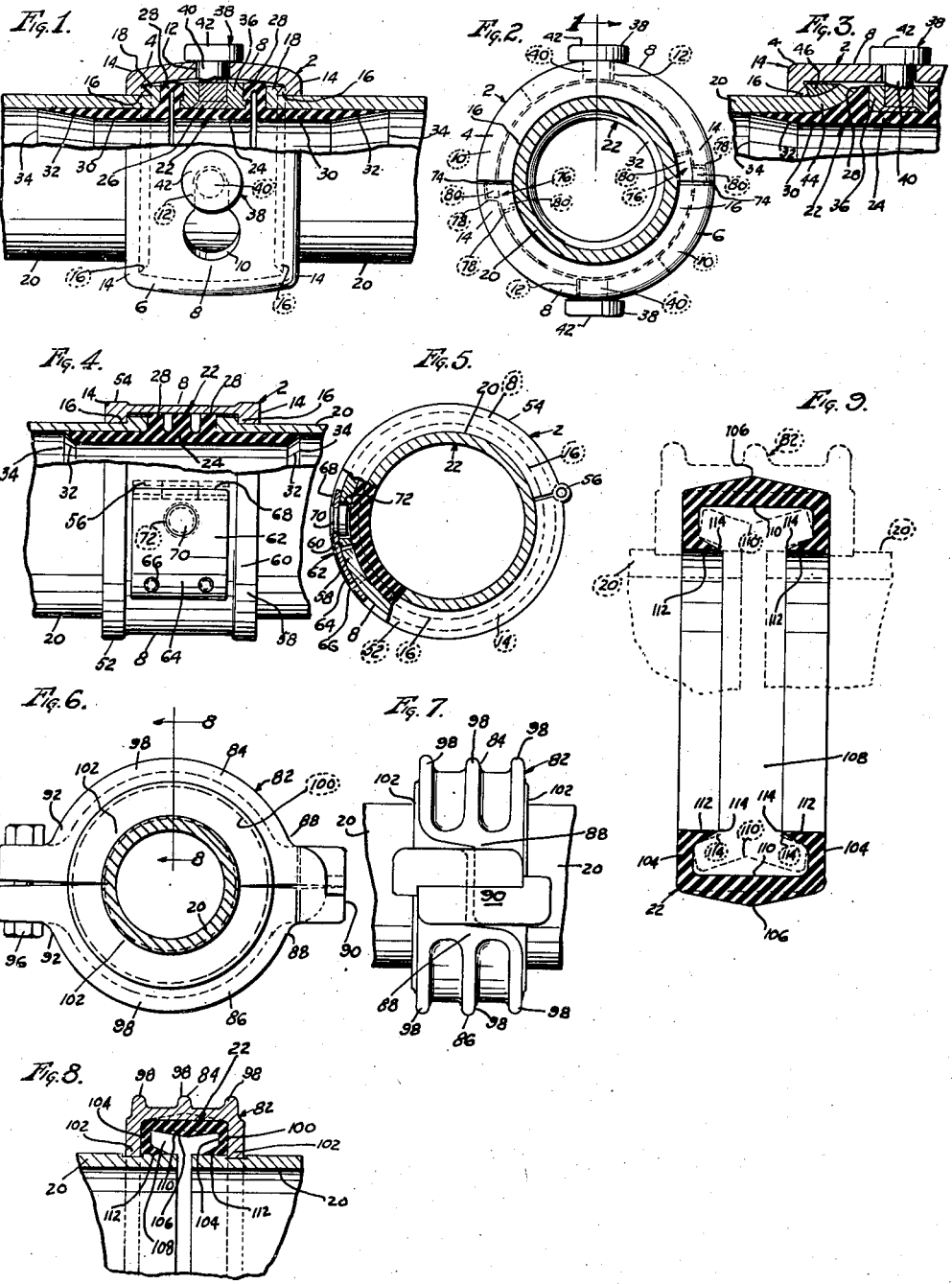
INVENTOR.
Charlie E. Ulrich Patented Oct. 22, 1940

2,218,835

UNITED STATES PATENT OFFICE 2,218,835

PIPE COUPLING, SEAL, AND THE LIKE

Charlie E. Ulrich, Los Angeles, Calif., assignor to Kelly Pipe Company, Los Angeles, Calif., a corporation of California Refile for abandoned application Serial No. 116,784, December 19, 1936. This application June 10, 1938, Serial No. 212,934

3 Claims. (Cl. 285—194)

This application was originally filed Dec. 19, 1936, Serial No. 116,784, and was abandoned.

My invention relates to the pipe couplings and more particularly to such devices which are particularly adaptable for holding, sealing and locking together the ends of pipe lengths, which are detachable, easily adjustable and due to its particular and simple structure are flexible in service, also, when in operation are adaptable for self adjustment, eliminating exact alignment of the pipes and conforming to any angular position to which said pipes or pipe lengths may be subjected due to their contraction or expansion caused by the atmospheric conditions, thus assuring ease of installation in curving trenches or over uneven ground and at the same time allowing the pipe lengths to be shifted to most desirable positions without a danger of causing the pipe joints to leak.

The present and general usage of couplings consists of various types, which are of diversified construction and application, which in many instances, primarily where the laid pipe lengths are exposed to all weather conditions, have been found to lack the continuous serviceability, which is due to the fact that the couplings now on the market are constructed and assembled out of numerous parts, and not only awkward to handle while assembling by unskilled laborers but easily rendered defective because of the multiplicity of parts it contains and the manner in which it must be handled.

In view of the aforesaid, it is obvious that when said parts of the coupling are not placed in proper places over the pipe ends at the time of assembly, not only that the coupling will be only of temporary relief or service, but also, the gasket or the resilient sealing ring element used therein may become ruptured and in short time causing leakage and corrosion of the pipe ends, which eventually will lead into complete disruption of the entire pipe line, aside from the fact that such assembly parts, such as bolts, screws, nuts and pins are rendered defective because of stripped threads, lost parts or members of the coupling, which causes undue delay and additional expenses in correcting the fault.

To that end, my invention provides for a very simple coupling means, consisting of parts which are rigid in construction, serviceable while in use, easily applicable over and to the pipe ends, having the gasket held firmly in place within the length ends, thus rendering said pipe ends permanently sealed, allowing no disruption of the coupling which may be caused by expansion, contraction or any angular displacement.

Further object of my invention is to provide said coupling with a sealing ring means, which is provided with suitable locking means in form of knobs and which is placed in-between the pipe length ends, having a pair of half housings encompassing said pipe ends and adapted to hold and lock in place said sealing ring means, thus causing the coupling to seal the pipe ends, rendering the pipe joints to be flexible under pressure or vacuum, so that the contraction or expansion of the said pipe lengths will strengthen and lock firmly in place said coupling, preventing its disengagement.

Another object of my invention is to provide said coupling means with a novel type gasket or sealing ring means, which may, if so desired, be made out of resilient or flexible material, having its internal diameter sufficiently large enough for easy assembly over the pipe ends and which, when in use, will expand and close all passages or joint crevices caused by uneven surfaces of the pipe ends, so that the pipe joint is rendered at all times sealed, preventing accumulation of rust or sediment which causes deterioration of said sealing ring means and thus preventing corrosion of the pipe ends.

Another object of my invention is to provide said coupling means with a novel type of locking means, which is of such construction whereby the locking of said coupling is simplified, which may be easily attached to and over the ends of the said pipe lengths and locked in place to prevent its disengagement.

Further object of my invention is to provide said coupling means with suitable coupling gasket means which is equipped with the locking ring means and positioned within and at the abutted ends of the pipe lengths which are to be coupled, also, having a pair of half housing means provided with suitable edge shoulder member, so that, when said half housing means are held in place by said ring member, the edge shoulder members will engage and hold in place said pipe ends by means of said abutments, thus permitting easy and quick installation and allowing a reasonable deflection of said pipe lengths in any direction, without a danger of causing joint leak.

Further object of my invention is to provide a novel type of coupling means, comprising a pair of half housing sections, said sections having one end provided with interlocking jaws while the other ends are provided with bolt holes and are adapted to be held in place by means of a suitable bolt member, so that when in place or position over the pipe ends said coupling will hold the gasket in place, also will provide a firm and reasonably flexible hold of the pipe length ends.

Another object of my invention is to provide said coupling of such construction, which will have very few parts in the entire set, which may be inexpensively manufactured and easily installed, which when in use will provide a maximum service, durability under all conditions and allowing minimum cost of maintenance.

Further objects and advantages of my invention, as will hereinafter more fully appear, I attain by the construction herein shown on the drawing and described in the specification, forming a part of my application.

Reference is had to the accompanying drawing, in which the similar reference characters denote the similar parts.

In the drawing:

Fig. 1 is the longitudinal cross-sectional and partly fragmentary elevational view of the pipe coupling, showing the locking ring, the sealing ring and the half-housings in position, taken on the line 1, of the Fig. 2.

Fig. 1 shows the end elevational view of the coupling, when attached to the pipe ends.

Fig. 3 is the longitudinal cross-sectional view of the coupling shown in modified form.

Fig. 4 shows the longitudinal cross-sectional view and a fragmentary elevation of the coupling, shown in modified form.

Fig. 5 is the elevational end view of the coupling, showing a partly cross-sectional structure of the coupling locking device, taken from the Fig. 4.

Fig. 6 is the side elevational view of my invention, showing the sealing ring member in place and over the pipe end member.

Fig. 7 shows the end view of the coupling, showing the locking means, taken in the direction of the arrow 7, of the Fig. 6.

Fig. 8 shows the cross-sectional view of the coupling and the sealing ring, said sealing ring as shown in dotted lines as in its original position before pressed in place by the coupling, taken on the line 8—8, of the Fig. 6.

Fig. 9 shows the cross-sectional view of the sealing ring, indicating in dotted lines its position when held in place by the coupling and indicating the position of the sealing ring lip members pressing against the pipe ends.

Describing my invention more in detail, in its broader aspects, said invention comprises a coupling, generally designated by numeral 2, said coupling consisting of, a pair of half housings 4 and 6 which are identical in construction, each having a base ring 8 provided with a suitable socket 10 and the locking groove 12, also having the sides 14 provided with suitable inward shoulder members 16, which are for the purpose to engage the pipe end ring 18 of the pipe end 20, as shown.

Said inward shoulder members 16 are far enough apart, in order to permit and allow to place the one piece sealing ring member 22 in position, which comprises a center section 24 having a recess member 26 provided therein as shown, also having a pair of ring expansion members 28 associated therewith and made an integral part thereof, the outward ends of which, as at 30, are provided with a ring cuff member 32, which may, if so desired, be tapered as at 34, so as to insure free flow of the fluids through the pipe lengths and also to eliminate the orifice friction otherwise unavoidable.

It may be noted, that the center section 24 forms a circular groove, wherein a suitable locking ring 36 is positioned, which may be made removable as required, or it may be vulcanized into said sealing ring member 22, and be made out of a suitable resilient material or fabric.

Also, said ring 36, may, if so desired, be provided with a suitable knob member 38, which may be made an integral part thereof, or it may be riveted therein and in place, as shown in Figs. 1 and 3, of which, the extended portion forming a knob neck 40 and terminating with a knob button member 42, the purpose of which will be presently described.

In order to lock in place said coupling 2 over the pipe ends 20 the sealing ring member 22 is placed within said pipe ends 20 while the half housings 4 and 6 are placed over the pipe end rings 18 causing an engagement of the shoulder members 16 therewith, allowing the knob button member 42 to pass through the socket 10 so that the knob neck 40 will engage the locking groove 12 of said half housings 4 and 6 respectively and thus causing said coupling 2 to be locked in place, quickly and permanently.

If it is so desired, the pipe ends 20 may be flared out as at 44, see Fig. 3, and a suitable pipe end supporting ring 46 may be placed against the flare, so as to provide means for engaging the said shoulder member 16 of said housings 4 and 6.

In the Figs. 4 and 5, said coupling 2 comprises a pair of half housings 52 and 54, which are hinged as at 56, having the opposite joint edges 58 and 60 provided with a locking device 62 of which, the joint edge 58 is provided with a suitable spring member 64, riveted thereto as at 66 and having the free end 68 provided with a suitable locking pin 70, while the opposite joint edge 60 is provided with suitable socket 72 adapted to receive therein the locking pin member 70, thus causing said half-housings 52 and 54 to engage the pipe ends 20 by means of their respective shoulder members 16 bearing against the pipe end rings 18, as shown.

Also, in order to insure the fitness and adaptability of said coupling 2 over the pipe ends 20 and at the coupling joints 74 which may not be closely enough fitted because of the irregularity and deformity of the pipe, therefore said half-housings 4 and 6 respectively, are provided with suitable lap joint members 76, comprising a female member 78 and the male extension member 80, see Fig. 2, so that when in use it will prevent the internal pressures or the vacuum, as the case might be, from distorting or rupturing said sealing ring member 22 and therefore insuring its durability under all conditions.

In the Figs. 6 and 7, is shown a pair of casings 82, which may be made out of two constructionally identical sections which are specifically designated as sections 84 and 86 respectively, having the end 88 of said sections 84 and 86 provided with locking boss 90 with which to interlock same and for holding it in position when assembled, also having the opposite ends 92 provided with hub members 94 which are to receive the locking bolt 96, as shown.

The sections 84 and 86, are provided externally, with a plurality of ribs 98 and internally with a flat top groove 100 thus forming a side lip sections 10 between which the sealing ring 22 is positioned, said ring 22 being adapted to be placed over the pipe ends 20 and thus providing an inexpensive seal to prevent the fluid leakage when in place and in use.

The sealing ring 22 is provided with side walls 104 which extends downwardly and slightly upwardly at an angle having a tapered top structure as at 106, the purpose of which will be presently described.

The said side walls 104, in the center, form a diametrically tubular cavity 108, having the center section 110 of the tapered top structure 106 heavier, as shown, and thus providing flexibility to the walls 104 and to the inwardly positioned gasket lip members 112 which extends upwardly and slightly at an angle, and therefore preventing an outward bulging movement of said side walls 104, consequently preventing pinching of the gasket surfaces and forcing said lip members 112 downwardly and against the said pipe end surfaces, when in place.

The lip end 114 of the said lip member 112 may be tapered inwardly and slightly upwardly at an angle as shown in Fig. 9, so as to eliminate the ruffling of its surface and when the gasket is subjected to the side thrust of the casings 82, or when the pipe ends 20 are not in alignment, also, to allow easy installation, the internal diameter of said lip members 112 may be larger than the diameter of the pipe, thus eliminating the conventional inversion of the gasket during installation, and therefore greatly simplifying the installation of the pipe line in the field.

It may be noted, that when the sealing ring 32 is in place and over the pipe ends, the center section 110 and the side walls 104 including the lip members 112 will contract, decreasing the internal cavity 108 of said ring, and thus preventing, to a great extent, an accumulation of dirt and other foreign matter therein, otherwise unavoidable, and thereby permitting said sealing ring, when not in use, to be thoroughly cleaned, before it is placed again, in service.

While I have thus described my invention with great particularity it will be clear that the same may be modified throughout a wide range.

I accordingly do not propose to be limited to the exact details of construction herein shown on the drawing and described in the specification, but reserve the right in practice to make the necessary changes therein, which may come within the scope of the appended claims.

I claim as my invention:

1. In a coupling of the class described adapted for holding, sealing and locking a pair of pipe ends together, said pipe ends having flared out pipe end abutments, sealing means positioned internally and within the said pipe ends for sealing the pipe joint and having a centrally extending grooved section adapted to form a joint when the said pipe ends are in place, a locking ring means centrally positioned and encompassing said grooved section to support the said centrally extending section having a pair of knob means extending outwardly therefrom, and a pair of half housing means encompassing said pipe ends having inwardly extending shoulder means for engaging the said pipe end abutments also having means for engaging the said knob means of the said locking ring means for holding the said pipe ends together and locking them in place, substantially as described.

2. In the coupling adapted for holding, sealing and locking the ends of the pipe lengths together, sealing means associated with said pipe ends for preventing leakage into or out of the said pipe lengths, a sealing and locking ring means centrally positioned and encompassing the said sealing means for sealing the pipe ends at the space between the pipe ends, and a pair of knob means connected to the said last mentioned means for holding and locking in place the said sealing means and the said pipe ends.

3. In a coupling of the class described, adapted to hold, seal and lock in place a pair of pipe ends, comprising a pair of half housings, sealing means positioned within said half housings for sealing the end of the said pipe ends, a locking ring means associated with the said sealing means having a pair of knob means extending therefrom, each of the said half housing means having a socket and a groove for engaging the said knob means of the said locking ring means adapted for holding the said pipe ends together and for forcing the said sealing means into place when locking the said pipe ends together.

CHARLIE E. ULRICH.